C. H. BISHOP.
SAW SET.
APPLICATION FILED MAY 14, 1910.
978,686.
Patented Dec. 13, 1910.
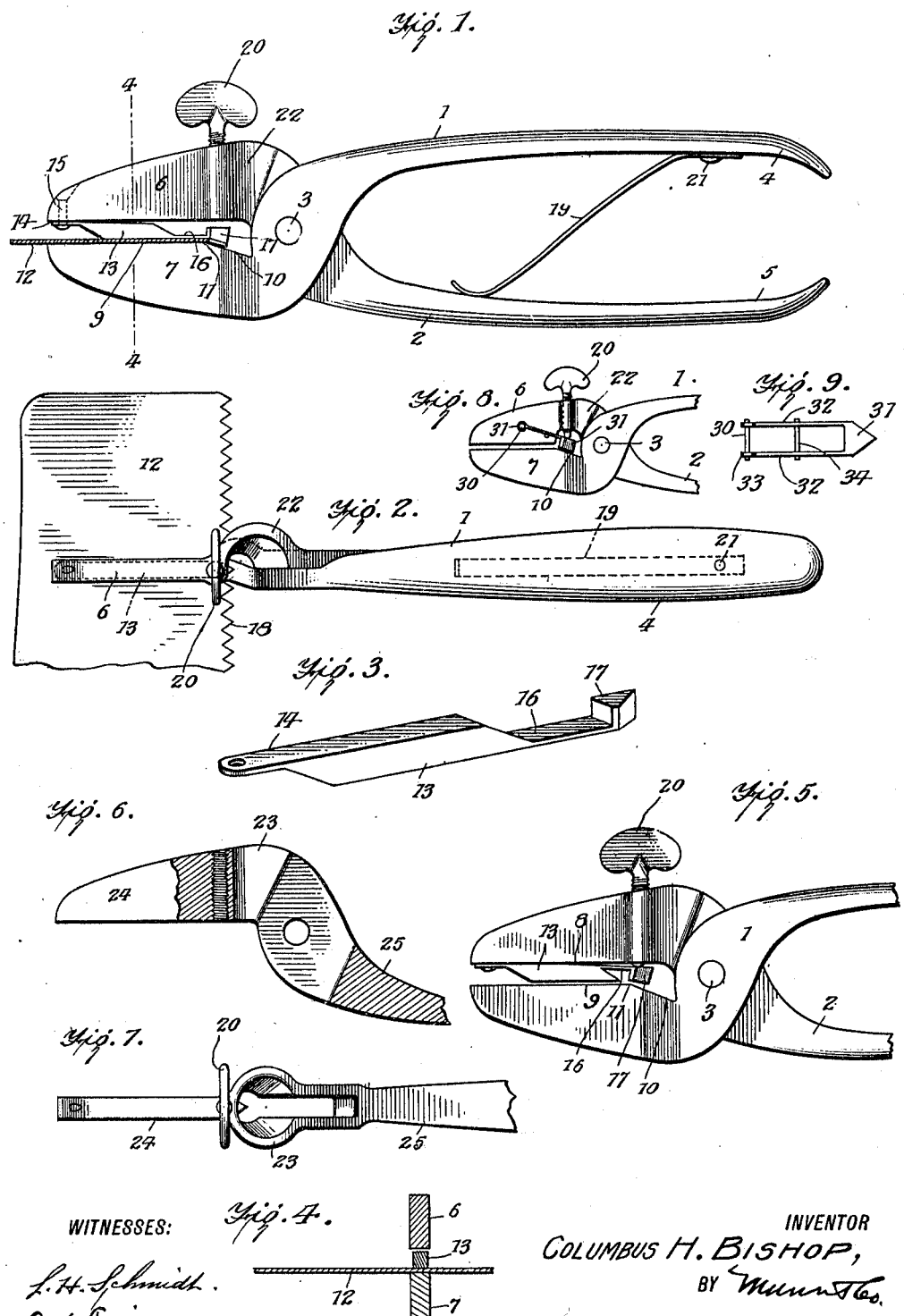
WITNESSES:
L. H. Schmidt
C. E. Trainer
INVENTOR
COLUMBUS H. BISHOP,
BY Munn & Co.
ATTORNEYS

UNITED STATES PATENT OFFICE.

COLUMBUS H. BISHOP, OF EL RENO, OKLAHOMA, ASSIGNOR OF ONE-HALF TO HENRY A. WHITE, OF HINTON, OKLAHOMA.

SAW-SET.

978,686.     Specification of Letters Patent.     Patented Dec. 13, 1910.

Application filed May 14, 1910. Serial No. 561,354.

*To all whom it may concern:*

Be it known that I, COLUMBUS H. BISHOP, a citizen of the United States, and a resident of El Reno, in Canadian county, State of Oklahoma, have invented certain new and useful Improvements in Saw-Sets, of which the following is a specification.

My invention is an improvement in saw sets, and consists in certain novel constructions and combinations of parts hereinafter described and claimed.

The object of the invention is to provide a combined set and clamp in a single tool and which will firmly grasp and hold the saw in position for setting and will set the teeth while the saw is so held.

Referring to the drawings forming a part hereof: Figure 1 is a side view of the improvement engaged with a saw; Fig. 2 is a top plan view; Fig. 3 is a detail perspective view of the setting block and the support; Fig. 4 is a section on the line 4—4 of Fig. 1; Fig. 5 is a side view of a modified form of gripping jaws with the parts in another position; Fig. 6 is a side view of the upper jaw partly in section; and Fig. 7 is a top plan view of the upper jaw, Fig. 8 is a partial side view of a modified form, and Fig. 9 is a plan view of the setting block.

The present embodiment of the invention comprises a pair of shanks 1 and 2 which are pivoted together in crossed relation, as at 3, to form a pair of handles 4 and 5 on one side of the pivot and a pair of jaws 6 and 7 on the other side.

The inner face 8 of the jaw 6 is plane, as shown in Figs. 1, 5 and 6, and the inner face of the jaw 7 is composed of two surfaces 9 and 10, the surface 9 being substantially parallel with the face 8 of the jaw 6, while the surface 10 is inclined and meets the surface 9 at an obtuse angle 11 to form an abrupt bend between the two surfaces.

When the tool is engaged with a saw 12, the surface 9 of the jaw 7 engages the lower face of the saw, and a bar 13 is arranged between the upper face of the saw and the face 8 of the jaw 6.

The bar 13 is provided at its outer end with a resilient lug 14, which is secured to the jaw 6 by a rivet 15. The bar is also provided with a resilient lug 16 at its opposite end and at the end of the lug is the setting block 17.

The upper and lower faces of the bar 13 are substantially parallel, the upper face engaging the inner face of the jaw 8 and the lower face the upper face of the saw when the tool is clamped on a saw. The bar is of such length that the setting block 17 extends just beyond the angle 11, the block coöperating with the surface 10 to set the saw tooth 18.

A set-screw 20 is threaded through the jaw 6 and engages the block 17 to hold said block in adjusted position, and the handles are normally pressed apart by a spring 19 secured to the handle 4 by one end, as at 21, and engaging the handle 5 with the other end.

In the construction shown in Figs. 1 and 2, an outwardly curved portion 22 is arranged between the jaw and the shank to permit the operation of the setting block to be visible. In the construction shown in Figs. 7 and 8 a vertical recess or opening 23 is provided at the junction of the jaw 24 and shank 25 for the same purpose.

The bar 13 and block 17 may be constructed in many different forms. As shown in Figs. 1 and 3, the lug 16 extends from the lower edge of the bar, and the block 17 extends upwardly, while in Fig. 5 the lug extends from the upper face of the bar and the block extends downwardly.

The invention comprises broadly gripping jaws, each having a gripping surface for holding the saw, one jaw having an inclined surface at the end of the gripping surface and the other a block for coöperating with the inclined surface and resiliently mounted on the jaw.

In the embodiment shown in Figs. 8 and 9, the jaw 6 is provided with a transverse opening, through which extends a pin 30, and the setting block is in the form of a yoke, the body 31 of the yoke acting as the setting block, while the arms 32 are provided with bearings 33 engaging the ends of the pin 30. A second pin 34 is passed through the jaw 6 below the arms and serves to support the block.

The arms 32 of the yoke are resilient, and the block is pressed toward the jaw 7 by the set screw 20. The jaw 7 is provided with the inclined surface 10 with which the block coöperates.

I claim:

1. In a tool of the character specified, a pair of opposed gripping jaws, the operative face of one jaw being plane and that of the other being composed of two surfaces, one substantially parallel with the operating face of the other jaw and the other inclining away from said face and meeting the other surface at an angle, a bar having at one end a resilient lug secured to the operative face of the first named jaw and at the other a similar lug having at its opposite end a setting block coöperating with the inclined surface, and a set-screw threaded through the first named jaw and engaging the block.

2. In a tool of the character specified, oppositely arranged gripping jaws, a bar having at each end a resilient lug arranged between the jaws, one of said lugs being secured to one of the jaws, a setting block integral with the other lug, and a set-screw passing through the jaw and engaging the block, the other jaw having adjacent to the block a beveled surface inclining away from the other jaw and with which the setting block coöperates.

3. In a tool of the character specified, oppositely arranged gripping jaws, each of said jaws having a gripping face, and one of the jaws having a setting face at one end of the gripping face and inclined with respect to the gripping face, a setting block having a resilient connection with the other jaw for coöperating with the setting face, and means for moving the block away from the jaw to which it is connected.

4. In a tool of the character specified, oppositely arranged gripping jaws, each of said jaws having a gripping face, and one of the jaws having a setting face at one end of the gripping face and inclined with respect to the gripping face, a setting block on the other jaw coöperating with the setting face, means for moving said block away from the jaw, and a yielding connection between the block and the jaw.

5. In a tool of the character specified, oppositely arranged jaws, one of said jaws having a setting face inclined with respect to the face of the other jaw, a setting block on the other jaw coöperating with the setting face, means for moving the said block away from the jaw to which it is connected, and a yielding connection between the block and the jaw.

COLUMBUS H. BISHOP.

Witnesses:
GEORGE JENSEN,
CLYDE MATTHEWS.